US011983367B2

(12) United States Patent
Kano et al.

(10) Patent No.: US 11,983,367 B2
(45) Date of Patent: May 14, 2024

(54) ELECTRONIC DEVICE AND METHOD OF DETERMINING WHETHER TOUCH SENSOR IS FOLDED

(71) Applicant: Murata Manufacturing Co., Ltd., Nagaokakyo (JP)

(72) Inventors: Hidekazu Kano, Nagaokakyo (JP); Hiroaki Kitada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/663,556

(22) Filed: May 16, 2022

(65) Prior Publication Data

US 2022/0334677 A1    Oct. 20, 2022

Related U.S. Application Data

(63) Continuation of application No. PCT/JP2021/025275, filed on Jul. 5, 2021.

(30) Foreign Application Priority Data

Jul. 6, 2020  (JP) ................................ 2020-116512

(51) Int. Cl.
*G06F 3/044* (2006.01)
*G06F 3/041* (2006.01)

(52) U.S. Cl.
CPC ........ *G06F 3/0445* (2019.05); *G06F 3/04166* (2019.05)

(58) Field of Classification Search
CPC ........................... G06F 3/0445; G06F 3/04166
See application file for complete search history.

(56) References Cited

U.S. PATENT DOCUMENTS

| 2012/0326971 A1 | 12/2012 | Zhou |
| 2018/0059822 A1 | 3/2018 | Seo et al. |
| 2018/0088633 A1 | 3/2018 | Whitman et al. |
| 2018/0120615 A1* | 5/2018 | Wang .................... G06F 3/0443 |

(Continued)

FOREIGN PATENT DOCUMENTS

JP    2015041272 A    3/2015

OTHER PUBLICATIONS

International Search Report issued for PCT/JP2021/025275, dated Aug. 10, 2021.

*Primary Examiner* — Liliana Cerullo
(74) *Attorney, Agent, or Firm* — Arentfox Schiff LLP

(57) ABSTRACT

An electronic device is provided in which a capacitance of a capacitor that is formed between one or more reference second touch sensor electrodes and at least one first touch sensor electrodes is defined as a first reference capacitance with the capacitor formed when the touch sensor is folded along a folding line. Moreover, a capacitance of a capacitor formed between a left second touch sensor electrode and at least one of the plurality of first touch sensor electrodes is defined as a left capacitance. Furthermore, a capacitance of a capacitor formed between a right second touch sensor electrode and at least one of the plurality of first touch sensor electrodes is defined as a right capacitance. Using these capacitances, a determining unit of the electronic device can determine that a touch sensor is folded if both the left and the right capacitances are greater than the first reference capacitance.

20 Claims, 8 Drawing Sheets

(56) References Cited

U.S. PATENT DOCUMENTS

2018/0342226 A1    11/2018  Shin et al.
2019/0042042 A1     2/2019  Hei et al.
2021/0048926 A1*    2/2021  Woo ...................... G06F 3/0447

* cited by examiner

ELECTRONIC DEVICE AND METHOD OF DETERMINING WHETHER TOUCH SENSOR IS FOLDED

CROSS REFERENCE TO RELATED APPLICATIONS

This application is a continuation of PCT Application No. PCT/JP2021/025275, filed Jul. 5, 2021, which claims priority to Japanese Patent Application No. 2020-116512, filed Jul. 6, 2020, the entire contents of each of which are hereby incorporated in their entirety.

TECHNICAL FIELD

The present invention relates to an electronic device including a touch sensor and a method of determining whether the touch sensor is folded.

BACKGROUND

Currently, there are conventional electronic devices that use a flexible touch display panels, as described in US Patent Publication No. 2019/0042042 A (hereinafter "Patent Document 1"), for example. When the flexible touch display panel is folded, each of the touch electrodes positioned on the left side of a folding line and corresponding touch electrode positioned on the right side of the folding line come to face each other. As a result, the capacitance of the touch electrodes increases. Therefore, in the flexible touch display panel, when the capacitance of the touch electrodes is greater than a threshold, it is determined that the flexible touch display panel is folded.

In the flexible touch display panel described in Patent Document 1, when a user's finger touches the flexible touch display panel, the capacitance of the touch electrode increases. Therefore, in the flexible touch display panel, it is sometimes difficult to distinguish between when the user's finger touches the flexible touch display panel and when the flexible touch display panel is folded.

SUMMARY OF THE INVENTION

Accordingly, it is an object of the present invention to provide an electronic device and a method of determining whether a touch sensor is folded. In an exemplary aspect, the electronic device is configured for distinguishing between when a user's finger touches the touch sensor and when the touch sensor is folded.

According to an exemplary embodiment, an electronic device is provided that includes a touch sensor having a dielectric film with a top surface and a bottom surface; a plurality of first touch sensor electrodes provided on the top surface of the dielectric film and extending in a left-right direction, the plurality of first touch sensor electrodes being disposed in a manner aligned in a front-back direction; a plurality of second touch sensor electrodes provided under the bottom surface of the dielectric film and extending in the front-back direction, with the plurality of second touch sensor electrodes being disposed in a manner aligned in the left-right direction; and a determining unit. In this aspect, one or more of the second touch sensor electrodes that are brought within a range of a first distance or less in the left-right direction from a folding line extending in the front-back direction are defined as one or more reference second touch sensor electrodes when the touch sensor is folded along the folding line. Moreover, a capacitance of a capacitor formed between the one or more reference second touch sensor electrodes and at least one of the plurality of first touch sensor electrodes and formed when the touch sensor is folded along the folding line is defined as a first reference capacitance. Furthermore, the second touch sensor electrode positioned nearest to but separated leftwards from the folding line by a second distance is defined as a left second touch sensor electrode, the second touch sensor electrode positioned nearest to but separated rightwards from the folding line by the second distance is defined as a right second touch sensor electrode, and the second distance is greater than the first distance. In addition, a capacitance of a capacitor formed between the left second touch sensor electrode and at least one of the plurality of first touch sensor electrodes is defined as a left capacitance, and a capacitance of a capacitor formed between the right second touch sensor electrode and at least one of the plurality of first touch sensor electrodes is defined as a right capacitance. According to the exemplary aspect, the determining unit is configured to determine that the touch sensor is folded when the left capacitance and the right capacitance are greater than the first reference capacitance.

According to another exemplary embodiment, an electronic device is provided that includes a touch sensor having a dielectric film with a top surface and a bottom surface; a plurality of first touch sensor electrodes provided on the top surface of the dielectric film and extending in a left-right direction, with the plurality of first touch sensor electrodes being disposed in a manner aligned in a front-back direction; a plurality of second touch sensor electrodes provided under the bottom surface of the dielectric film and extending in the front-back direction, with the plurality of second touch sensor electrodes being disposed in a manner aligned in the left-right direction; and a determining unit. In this aspect, a capacitance of a capacitor formed between a second touch sensor electrode positioned nearest to the folding line and any one of the plurality of first touch sensor electrodes is defined as a second reference capacitance, the capacitor being formed when the touch sensor is folded along a folding line extending in the front-back direction, the second touch sensor electrode positioned nearest to but separated leftwards from the folding line by a second distance is defined as a left second touch sensor electrode, the second touch sensor electrode positioned nearest to but separated rightwards from the folding line by the second distance is defined as a right second touch sensor electrode, a capacitance of a capacitor formed between the left second touch sensor electrode and at least one of the plurality of first touch sensor electrodes is defined as a left capacitance, and a capacitance of a capacitor formed between the right second touch sensor electrode and at least one of the plurality of first touch sensor electrodes is defined as a right capacitance. In the exemplary aspect, the determining unit is configured to determine that the touch sensor is folded when an intensity of a signal indicating the left capacitance input to the determining unit and an intensity of a signal indicating the right capacitance input to the determining unit are greater than an intensity of a signal indicating the second reference capacitance input to the determining unit.

According to another exemplary embodiment, a method is provided for determining whether an electronic device is folded. In this aspect, the method is executed by the electronic device that includes a touch sensor having a dielectric film with having a top surface and a bottom surface; a plurality of first touch sensor electrodes provided on the top surface of the dielectric film and extending in a left-right direction, with the plurality of first touch sensor electrodes being disposed in a manner aligned in a front-back direction; and a plurality of second touch sensor electrodes provided under the bottom surface of the dielectric film and extending in the front-back direction, with the plurality of second touch sensor electrodes being disposed in a manner aligned in the left-right direction. In this aspect, the method includes defining one or more of the second touch sensor electrodes that are brought within a range of a first distance or less in the left-right direction from a folding line extending in the front-back direction as one or more reference second touch sensor electrodes when the touch sensor is folded along the folding line; defining a capacitance of a capacitor formed between the one or more reference second touch sensor electrodes and at least one of the plurality of first touch sensor electrodes as a first reference capacitance, with the capacitance being formed when the touch sensor is folded along the folding line; defining the second touch sensor electrodes positioned nearest to but separated leftwards from the folding line by a second distance as a left second touch sensor electrode; defining the second touch sensor electrodes positioned nearest to but separated rightwards from the folding line by the second distance as a right second touch sensor electrode; assuming that the second distance is greater than the first distance; defining a capacitance of a capacitor formed between the left second touch sensor electrode and at least one of the plurality of first touch sensor electrodes as a left capacitance; defining a capacitance of a capacitor formed between the right second touch sensor electrode and at least one of the plurality of first touch sensor electrodes as a right capacitance; and determining that the touch sensor is folded when the left capacitance and the right capacitance are greater than the first reference capacitance.

According to yet another exemplary embodiment, a method of determining whether an electronic device is folded is provided with the method being executed by the electronic device that includes a touch sensor having a dielectric film with a top surface and a bottom surface; a plurality of first touch sensor electrodes provided on the top surface of the dielectric film and extending in a left-right direction, with the plurality of first touch sensor electrodes being disposed in a manner aligned in a front-back direction; and a plurality of second touch sensor electrodes provided under the bottom surface of the dielectric film and extending in the front-back direction, with the plurality of second touch sensor electrodes being disposed in a manner aligned in the left-right direction. In this aspect, the method includes defining a capacitance of a capacitor formed between a second touch sensor electrode positioned nearest to the folding line and any one of the plurality of first touch sensor electrodes as a second reference capacitance, with the capacitance being formed when the touch sensor is folded along a folding line extending in the front-back direction; defining the second touch sensor electrode positioned nearest to but separated leftwards from the folding line by a second distance as a left second touch sensor electrode; defining the second touch sensor electrode positioned nearest to but separated rightwards from the folding line by the second distance as a right second touch sensor electrode; defining a capacitance of a capacitor formed between the left second touch sensor electrode and at least one of the plurality of first touch sensor electrodes as a left capacitance; defining a capacitance of a capacitor formed between the right second touch sensor electrode and at least one of the plurality of first touch sensor electrodes as a right capacitance; and determining that the touch sensor is folded when an intensity of a signal indicating the left capacitance and an intensity of a signal indicating the right capacitance are greater than an intensity of a signal indicating the second reference capacitance.

In the description herein, an axis or a member extending in a front-back direction does not necessarily mean only an axis or a member extending in parallel with the front-back direction. Instead, for purposes of this disclosure, an axis or a member extending in the front-back direction includes any axis or member inclined within a range of ±45° with respect to the front-back direction. Similarly, an axis or a member extending in an up-and-down direction includes any axis or member inclined within a range of ±45° with respect to the up-and-down direction. Yet further, an axis or a member extending in a left-right direction includes any axis or member inclined within a range of ±45° with respect to the left-right direction.

Hereinafter, a first member, a second member, and a third member are structures included in the electronic device. In the description herein, a configuration in which the first member is supported by the second member includes a configuration in which the first member is attached to the second member in a manner not movable with respect to the second member (i.e., fixed), and a configuration in which the first member is attached to the second member in a manner movable with respect to the second member. The configuration in which the first member is supported by the second member also includes both of a configuration in which the first member is directly attached to the second member and a configuration in which the first member is attached to the second member with the third member interposed therebetween.

In the description herein, the first member and the second member that are aligned in the front-back direction means a following configuration. In particular, when the first member and the second member are viewed in a direction perpendicular to the front-back direction, both of the first member and the second member are disposed along any straight line representing the front-back direction. Moreover, in the description herein, a configuration in which the first member and the second member are aligned in the front-back direction in a view in the up-and-down direction means a following configuration. Specifically, when the first member and the second member are viewed in the up-and-down direction, both of the first member and the second member are disposed along any straight line representing the front-back direction. In this configuration, when the first member and the second member are viewed in the left-right direction that is different from the up-and-down direction, it is possible for one of the first member and the second member not to be disposed along any straight line representing the front-back direction. In addition, the first member and the second member can be in contact with each other, but the first member and the second member can also be separated from each other. The third member may be interposed between the first member and the second member. This definition is also applicable to directions other than the front-back direction.

In the description herein, a configuration in which the first member is disposed in front of the second member means the following configuration. In particular, a part of the first member is disposed in an area where the second member passes through when the second member is moved forwardly in parallel. In other words, the first member may be within the area where the second member passes through when the second member is moved forwardly in parallel, or may be sticking out from the area where the second member passes through when the second member is moved forwardly in parallel. In this configuration, the first member and the second member are aligned in the front-back direction. It is also noted that this definition is also applicable to directions other than the front-back direction.

In the description herein, a configuration in which the first member is disposed in front of the second member in a view in the left-right direction means the following configuration. In a view in the left-right direction, the first member and the second member are aligned in the front-back direction, and in a view in the left-right direction, a part of the first member, the part being a part facing the second member, is disposed in front of the second member. According to this definition, the first member and the second member may not be aligned in the front-back direction three dimensionally. This definition is also applicable to directions other than the front-back direction.

In the description herein, a configuration in which the first member is disposed on the front side with respect to the second member means the following configuration. The first member is disposed in front of a plane passing through the front end of the second member and orthogonal to the front-back direction. According to this definition, the first member and the second member can be (or not) aligned in the front-back direction. This definition is also applicable to directions other than the front-back direction.

In the description herein, each part of the first member is defined as follows, unless otherwise specified. A front part of the first member means the front half of the first member. A rear part of the first member means the rear half of the first member. A left part of the first member means the left half of the first member. A right part of the first member means the right half of the first member. An upper part of the first member means the upper half of the first member. A lower part of the first member means the lower half of the first member. A front end of the first member means an end of the first member, the end being on the front side. A rear end of the first member means an end of the first member, the end being on the rear side. A left end of the first member means an end of the first member, the end being on the left side. A right end of the first member means an end of the first member, the end being on the right side. An upper end of the first member means an end of the first member, the end being on the upper side. A lower end of the first member means an end of the first member, the end being on the lower side. A front end portion of the first member means the front end of the first member and a portion near the front end. A rear end portion of the first member means the rear end of the first member and a portion near the rear end. A left end portion of the first member means the left end of the first member and a portion near the left end. A right end portion of the first member means the right end of the first member and a portion near the right end. An upper end portion of the first member means the upper end of the first member and a portion near the upper end. A lower end portion of the first member means the lower end of the first member and a portion near the lower end.

In the description herein, the phrase "the first member and the second member are electrically connected" has the following two meanings in an exemplary aspect. The first exemplary aspect is that a direct current can flow through the first member and the second member because the first member and the second member are in physical contact with each other. The second exemplary aspect is that a direct current can flow through the first member and the second member because the first member and the third member are in physical contact with each other and the third member and the second member are in physical contact with each other.

In the second exemplary aspect, the first member and the second member may or may not be in physical contact with each other. In the second exemplary aspect, the third member may be a single member or may include a plurality of members.

With the electronic device and the method of determining whether a touch sensor is folded, it can be distinguished between when a user's finger touches the touch sensor and when the touch sensor is folded.

DETAILED DESCRIPTION OF EMBODIMENTS

First Exemplary Embodiment

[Configuration of Electronic Device]

Figure 1:
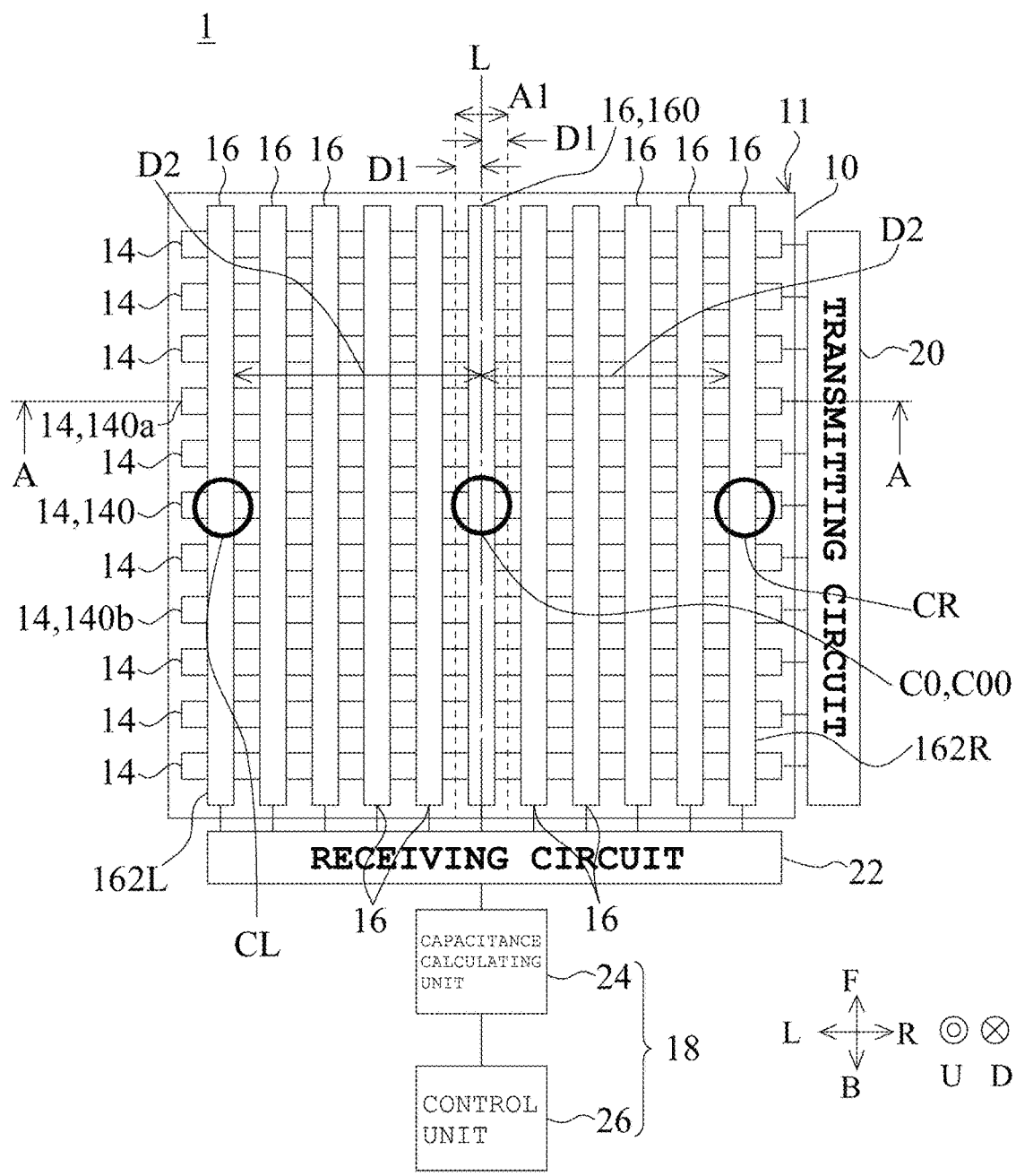
FIG. 1 is a configuration diagram of an electronic device 1 according to an exemplary embodiment.
Figure 2:
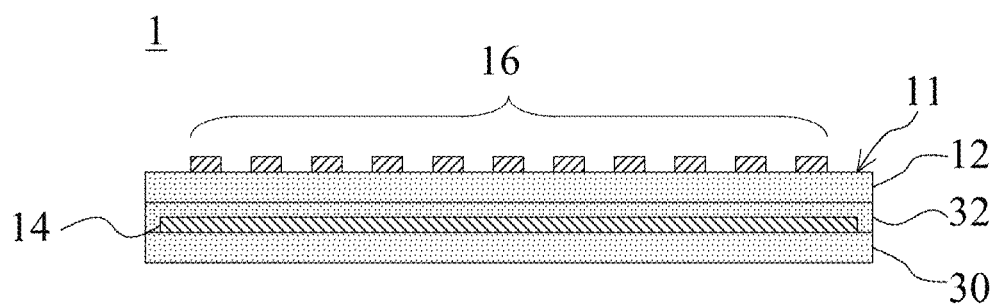
FIG. 2 is a sectional view across the line A-A in FIG. 1.
Figure 2:
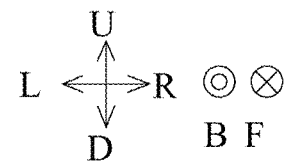
Figure 3:
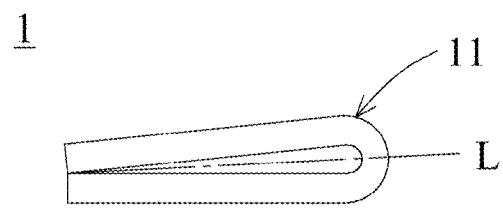
FIG. 3 is a view of the electronic device 1 folded along a folding line L.
Figure 3:
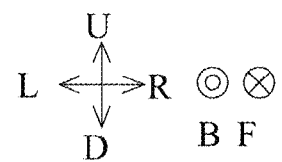

A configuration of an electronic device 1 according to a first exemplary embodiment will now be explained with reference to some drawings. FIG. 1 is a configuration diagram of the electronic device 1. FIG. 2 is a sectional view across the line A-A in FIG. 1. It is noted that the display 10 is not illustrated in FIG. 2. FIG. 3 is a schematic of the electronic device 1 folded along a folding line L. The method of determining whether the touch sensor 11 is folded is a determination method executed by the electronic device 1.

For purposes of this disclosure, directions are defined as follows. A direction in which the normal line of the unfolded touch sensor 11 extends is defined as an up-and-down direction (e.g., "U" direction and "D" direction of FIG. 1). A direction in which first touch sensor electrodes 14 of the touch sensor 11 extend is defined as a left-right direction (e.g., "L" direction and "R" direction of FIG. 1). A direction in which second touch sensor electrodes 16 of the touch sensor 11 extend is defined as a front-back direction (e.g., "F" direction and "B" direction of FIG. 1). The up-and-down direction, the left-right direction, and the front-back direction are orthogonal to one another. It is noted that the definitions of the directions provided herein are exemplary. Therefore, the direction at the time of actual use of the electronic device 1 does not need to coincide with the direction as defined herein. The up-and-down direction in FIG. 1 may be reversed. Similarly, the left-right direction in FIG. 1 may be reversed. Likewise, the front-back direction in FIG. 1 may be reversed.

In an exemplary aspect, the electronic device 1 can be, for example, a foldable smartphone. As illustrated in FIGS. 1 and 2, the electronic device 1 includes a display 10, a touch sensor 11, a transmitting circuit 20, a receiving circuit 22, and a determining unit 18. The display 10 displays a video (or image) for a user in one exemplary aspect. The display 10 emits light in an upward direction. The display 10 is, for example, a flexible organic EL display and has a sheet-like shape. The display 10 has a top surface and a bottom surface. Moreover, the display 10 has a rectangular shape in a downward view. Because the display 10 has a general structure, explanations thereof will be omitted.

As shown, the touch sensor 11 is provided on the top surface of the display 10. The touch sensor 11 covers the entire top surface of the display 10. In general, the touch sensor 11 is an input unit that detects a position at which a user's finger touches the touch sensor 11. The touch sensor 11 is, for example, a capacitive touch sensor. The touch sensor 11 will now be explained in details.

As illustrated in FIGS. 1 and 2, the touch sensor 11 includes a dielectric film 12, a plurality of first touch sensor electrodes 14, a plurality of second touch sensor electrodes 16, an insulating layer 30, and an adhesive layer 32. The dielectric film 12 has a sheet-like shape with a top surface and a bottom surface. The dielectric film 12 has a rectangular shape in a downward view. The material of the dielectric film 12 is, for example, polyethylene terephthalate (PET), polyethylene naphthalate (PEN), or polypropylene (PP).

The insulating layer 30 has a sheet-like shape with a top surface and a bottom surface. The insulating layer 30 has a rectangular shape in a downward view. The insulating layer 30 is disposed under the dielectric film 12. The material of the insulating layer 30 is, for example, PET, PEN, or PP. The adhesive layer 32 bonds the dielectric film 12 to the insulating layer 30. In this manner, the dielectric film 12, the insulating layer 30, and the adhesive layer 32 are integrated.

As illustrated in FIG. 2, the first touch sensor electrodes 14 are provided under the bottom surface of the dielectric film 12. In this embodiment, as illustrated in FIG. 2, the first touch sensor electrodes 14 are provided on the top surface of the insulating layer 30. The first touch sensor electrodes 14 extend in the left-right direction. In this embodiment, the first touch sensor electrodes 14 extend linearly in the left-right direction. The first touch sensor electrodes 14 are disposed in a manner aligned in the front-back direction. In this embodiment, the first touch sensor electrodes 14 are aligned at an equal interval in the front-back direction.

As illustrated in FIG. 2, the second touch sensor electrodes 16 are provided on the top surface of the dielectric film 12. In this embodiment, the second touch sensor electrodes 16 are provided to the top surface of the dielectric film 12. The second touch sensor electrodes 16 extend in the front-back direction. In this embodiment, the second touch sensor electrodes 16 extend linearly in the front-back direction. The second touch sensor electrodes 16 are disposed in a manner aligned in the left-right direction, such that the second touch sensor electrodes 16 are aligned at an equal interval in the left-right direction. Accordingly, each of the second touch sensor electrodes 16 intersects (e.g., overlap in a plan view) with the first touch sensor electrodes 14 in a downward view. For example, in the exemplary aspect as shown in FIG. 1, the first touch sensor electrodes 14 and the second touch sensor electrodes 16 exhibit a lattice-like configuration. The material of the first touch sensor electrodes 14 and the second touch sensor electrodes 16, as described above, is for example, ITO.

The transmitting circuit 20 transmits a transmission signal to the first touch sensor electrodes 14. The transmitting circuit 20 is an electric circuit including a multiplexer. The multiplexer selects the first touch sensor electrodes 14 sequentially one by one. The transmitting circuit 20 transmits a transmission signal to the first touch sensor electrode 14 selected by the multiplexer. In the manner described above, the first touch sensor electrodes 14 serve as transmitting electrodes. Because the transmitting circuit 20 has a general structure, explanations thereof will be omitted.

The receiving circuit 22 is configured to receive a reception signal from the second touch sensor electrodes 16. The receiving circuit 22 is an electric circuit including a multiplexer that is configured to select the second touch sensor electrodes 16 sequentially one by one. The receiving circuit 22 receives a reception signal from the second touch sensor electrode 16 selected by the multiplexer. In the manner described above, the second touch sensor electrodes 16 serve as receiving electrodes. Because the receiving circuit 22 has a general structure, explanations thereof will be omitted.

The determining unit 18 includes a capacitance calculating unit 24 and a control unit 26. In an exemplary aspect, the determining unit 18 is implemented by a CPU, for example. The capacitance calculating unit 24 is configured to calculate capacitance of a plurality of capacitors formed between the first touch sensor electrodes 14 and the second touch sensor electrodes 16 based on reception signals. As the intensity of a reception signal increases, the capacitance increases, accordingly. The control unit 26 determines whether the touch sensor 11 is folded based on the capacitances calculated by the capacitance calculating unit 24.

As illustrated in FIG. 1, one of the first touch sensor electrodes 14 is defined as a calculational first touch sensor electrode 140. In this embodiment, among the first touch sensor electrodes 14, the first touch sensor electrode 14 positioned at the center in the up-and-down direction is defined as the calculational first touch sensor electrode 140.

As illustrated in FIG. 3, when the touch sensor 11 is folded along a folding line L extending in the front-back direction, one or more second touch sensor electrodes 16 positioned within a range A1 that is separated from the folding line L by a first distance D1 or less in each of the left and the right sides are defined as one or more reference second touch sensor electrodes 160 (see FIG. 1). In this embodiment, the folding line L extends in the front-back direction at the center of the touch sensor 11 in the left-right direction. As shown in FIG. 1, the first distance D1 is smaller than the interval between adjacent two second touch sensor electrodes 16 in the left-right direction. Therefore, among the second touch sensor electrodes 16, the one second touch sensor electrode 16 positioned at the center in the left-right direction corresponds to the reference second touch sensor electrode 160.

The second touch sensor electrode 16 at the position nearest to, but separated leftwards from the folding line L by a second distance D2, is defined as a left second touch sensor electrode 162L. As clearly shown, the second distance D2 is longer than the first distance D1. In this embodiment, the left second touch sensor electrode 162L is the leftmost second touch sensor electrode 16, among the second touch sensor electrodes 16.

The second touch sensor electrode 16 at the position nearest to, but separated rightwards from the folding line L by the second distance D2, is defined as a right second touch sensor electrode 162R. In this embodiment, the right second touch sensor electrode 162R is the rightmost second touch sensor electrode 16, among the second touch sensor electrodes 16.

A capacitance of a capacitor formed between the one or more reference second touch sensor electrodes 160 and at least one of the first touch sensor electrodes 14 when the touch sensor 11 is folded along the folding line L is defined as a first reference capacitance C0. In this embodiment, the first reference capacitance C0 is the capacitance of a capacitor formed between the one or more reference second touch sensor electrodes 160 and the calculational first touch sensor electrode 140 shown in FIG. 1, for example.

A capacitance formed between the left second touch sensor electrode 162L and at least one of the first touch sensor electrodes 14 is defined as a left capacitance CL. In this embodiment, the left capacitance CL is the capacitance of a capacitor formed between the left second touch sensor electrode 162L and the calculational first touch sensor electrode 140.

A capacitance formed between the right second touch sensor electrode 162R and at least one of the first touch sensor electrodes 14 is defined as a right capacitance CR. In this embodiment, the right capacitance CR is the capacitance of a capacitor formed between the right second touch sensor electrode 162R and the calculational first touch sensor electrode 140.

The capacitance calculating unit 24 in the determining unit 18 is configured to calculate the left capacitance CL, the right capacitance CR, and the first reference capacitance C0 based on the reception signals. Further, the control unit 26 in the determining unit 18 determines that the touch sensor 11 is folded when the left capacitance CL and the right capacitance CR are greater than the first reference capacitance C0. By contrast, the determining unit 18 determines that the touch sensor 11 is not folded when the left capacitance CL and the right capacitance CR are equal to or lower than the first reference capacitance C0.

[Operation of Electronic Device]

Figure 4:
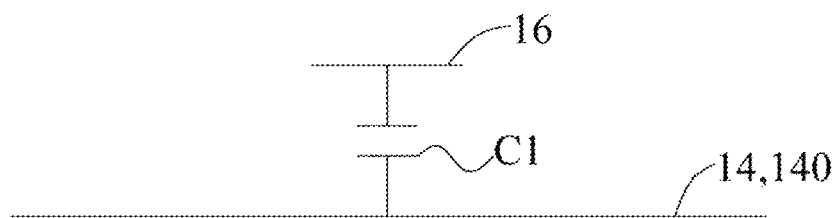
FIG. 4 is a schematic illustrating the capacitance of a capacitor formed between a calculational first touch sensor electrode 140 and a second touch sensor electrode 16 when neither a user's finger is touching a touch sensor 11 nor the touch sensor 11 is folded along the folding line L.
Figure 5:
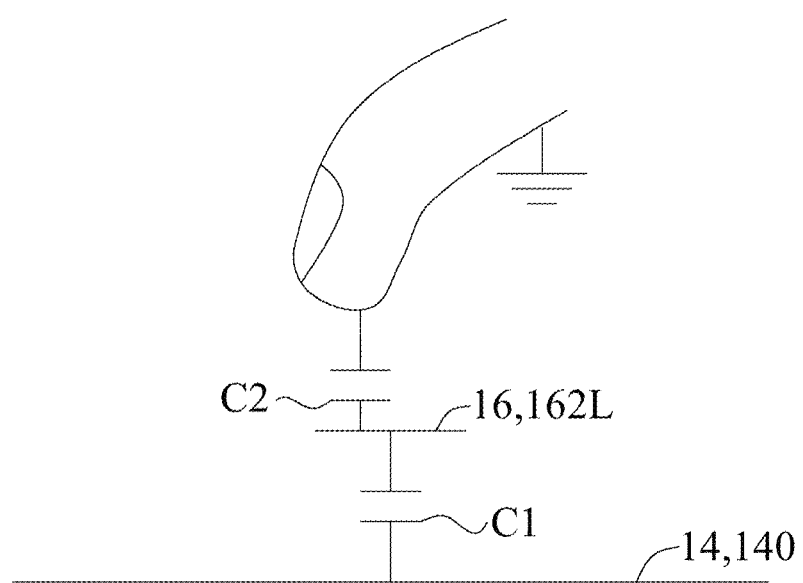
FIG. 5 is a schematic illustrating the capacitance of a capacitor formed between the calculational first touch sensor electrode 140 and a left second touch sensor electrode 162L when the user's finger is touching the touch sensor 11.
Figure 6:
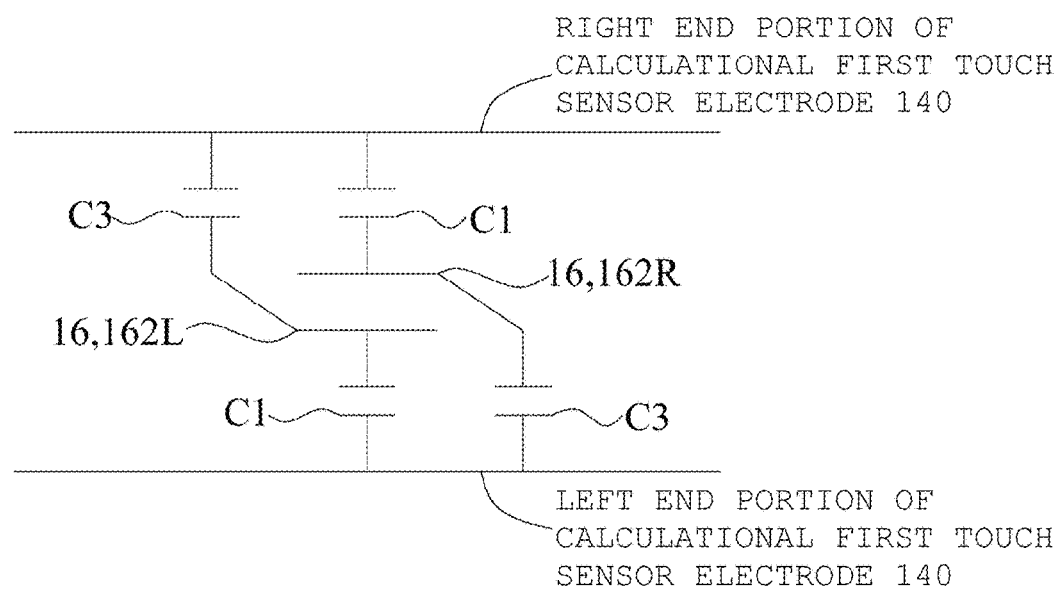
FIG. 6 is a schematic illustrating a capacitance of a capacitor formed between the calculational first touch sensor electrode 140 and the left second touch sensor electrode 162L when touch sensor 11 is folded along folding line L.

An operation of the determining unit 18 will now be explained with reference to some drawings. FIG. 4 is a schematic illustrating the capacitance of a capacitor formed between the calculational first touch sensor electrode 140 and a second touch sensor electrode 16 when neither the user's finger is touching the touch sensor 11 nor the touch sensor 11 is folded along the folding line L. FIG. 5 is a schematic illustrating the capacitance of a capacitor formed between the calculational first touch sensor electrode 140 and the left second touch sensor electrode 162L when the user's finger is touching the touch sensor 11. FIG. 6 is a schematic illustrating the capacitance of a capacitor formed between the calculational first touch sensor electrode 140 and the left second touch sensor electrode 162L, and the capacitance of a capacitor formed between the calculational first touch sensor electrode 140 and the right second touch sensor electrode 162R when the touch sensor 11 is folded along the folding line L. Hereinafter, the state illustrated in FIG. 4 is defined as an ordinary (e.g., a resting) state. The state illustrated of FIG. 5 is defined as a touched state. The state illustrated of FIG. 6 is defined as a folded state.

Figure 7:
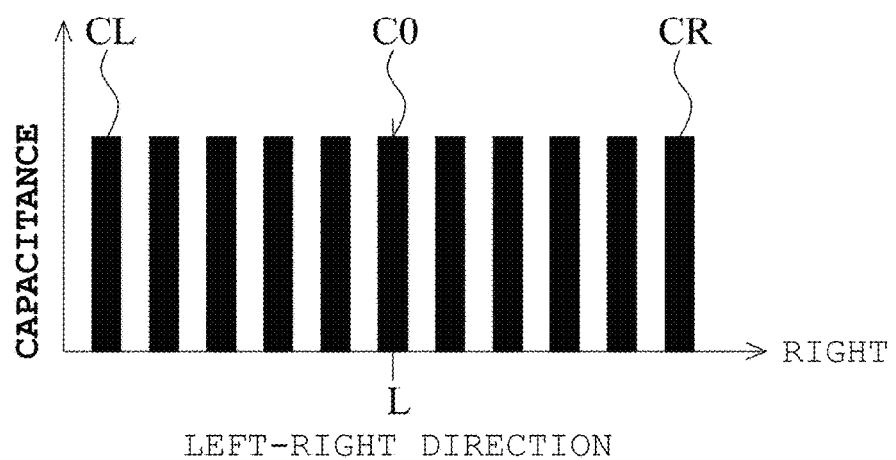
FIG. 7 is a graph illustrating a capacitance distribution in an ordinary state.
Figure 8:
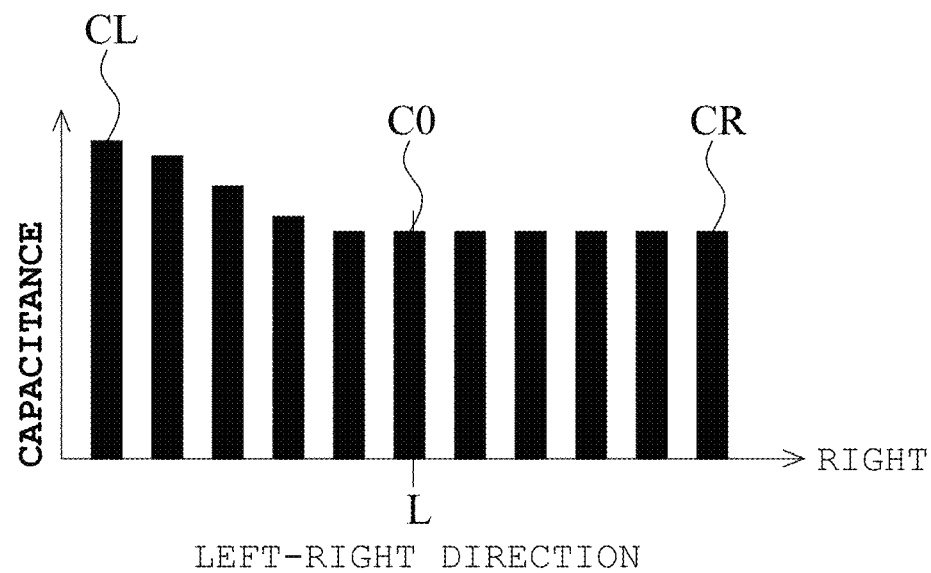
FIG. 8 is a graph illustrating a capacitance distribution in a touched state.
Figure 9:
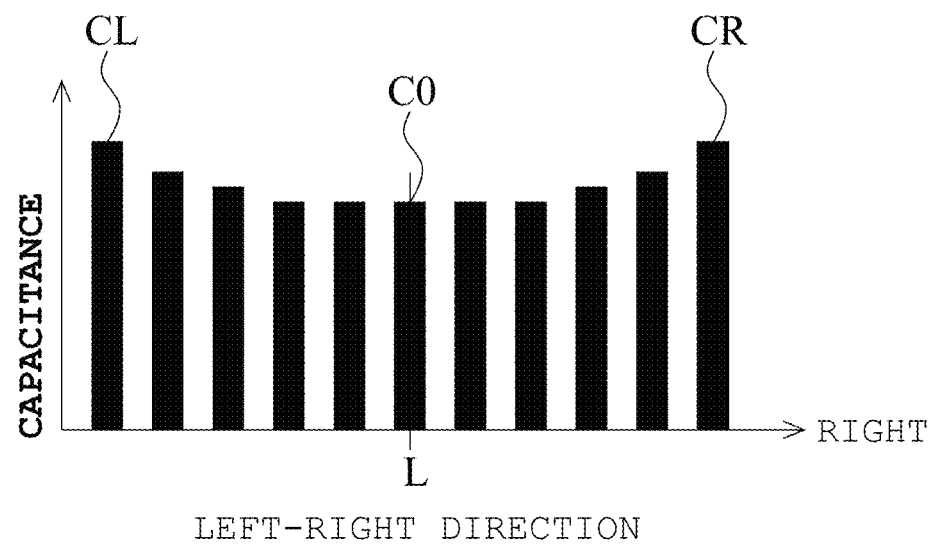
FIG. 9 is a graph illustrating a capacitance distribution in a folded state.

FIG. 7 is a graph illustrating a capacitance distribution in the ordinary state. FIG. 8 is a graph illustrating a capacitance distribution in the touched state. FIG. 9 is a graph illustrating a capacitance distribution in the folded state. In FIGS. 7 to 9, the vertical axis represents the capacitance. The horizontal axis in FIGS. 7 to 9 indicates a position in the left-right direction. FIGS. 7 to 9 illustrate the capacitance of a plurality of capacitors formed between the calculational first touch sensor electrode 140 and the second touch sensor electrodes 16, respectively.

As illustrated in FIG. 4, the capacitances of capacitors formed between the calculational first touch sensor electrode 140 and the second touch sensor electrodes 16 in the ordinary state are capacitance C1. The capacitance of each of the capacitors formed between the calculational first touch sensor electrode 140 and the respective second touch sensor electrodes 16 is substantially equal to the capacitance C1. In the description herein, being "substantially equal" has a meaning including being equal and being slightly different due to manufacturing variations, for example. When the left capacitance CL, the right capacitance CR, and the first reference capacitance C0 are equal to the capacitance C1, the control unit 26 is configured to determine that the touch sensor 11 is in the ordinary or resting state.

In the touched state, as illustrated in FIG. 5, a capacitance is formed between left second touch sensor electrode 162L and the user's finger. This capacitance is a capacitance C2. At this time, the left capacitance CL of a capacitor formed between the left second touch sensor electrode 162L and the calculational first touch sensor electrode 140 is equal to the sum of the capacitance C1 and the capacitance C2. Therefore, the left capacitance CL of the capacitor formed between the left second touch sensor electrode 162L and the calculational first touch sensor electrode 140 is greater than the capacitances of the capacitors formed between the other second touch sensor electrodes 16 and the calculational first touch sensor electrode 140, respectively. Hence, as illustrated in FIG. 8, the left capacitance CL is greater than the right capacitance CR and the first reference capacitance C0. Therefore, when the left capacitance CL is greater than the right capacitance CR and the first reference capacitance C0, the control unit 26 is configured to determine that the touch sensor 11 is in the touched state by a user of the electronic device.

In the folded state, as illustrated in FIG. 3, the left end portion of the touch sensor 11 and the right end portion of the touch sensor 11 are brought into contact with each other. At this time, as illustrated in FIG. 6, a capacitor is formed between the left second touch sensor electrode 162L and the right end portion of the calculational first touch sensor electrode 140. Similarly, a capacitor is formed between the right second touch sensor electrode 162R and the left end portion of the calculational first touch sensor electrode 140. These capacitances are defined as a capacitance C3. At this time, the left capacitance CL of the capacitor formed between the left second touch sensor electrode 162L and the calculational first touch sensor electrode 140 is equal to the sum of the capacitance C1 and the capacitance C3. The right capacitance CR of the capacitor formed between the right second touch sensor electrode 162R and the calculational first touch sensor electrode 140 is equal to the sum of the capacitance C1 and the capacitance C3. In addition, as illustrated in FIG. 9, the capacitances increase as the distance from the folding line L increases in the leftward direction. Furthermore, the capacitances increase as the distance from the folding line L increases in the rightward direction. Therefore, the left capacitance CL and the right capacitance CR are greater than the first reference capacitance C0 of the capacitor formed between the reference second touch sensor electrode 160 and the calculational first touch sensor electrode 140. In addition, the left capacitance CL and the right capacitance CR are substantially equal. Based on this configuration, the control unit 26 determines that the touch sensor 11 is in the folded state when the left capacitance CL and the right capacitance CR are greater than the first reference capacitance C0.

Figure 10:
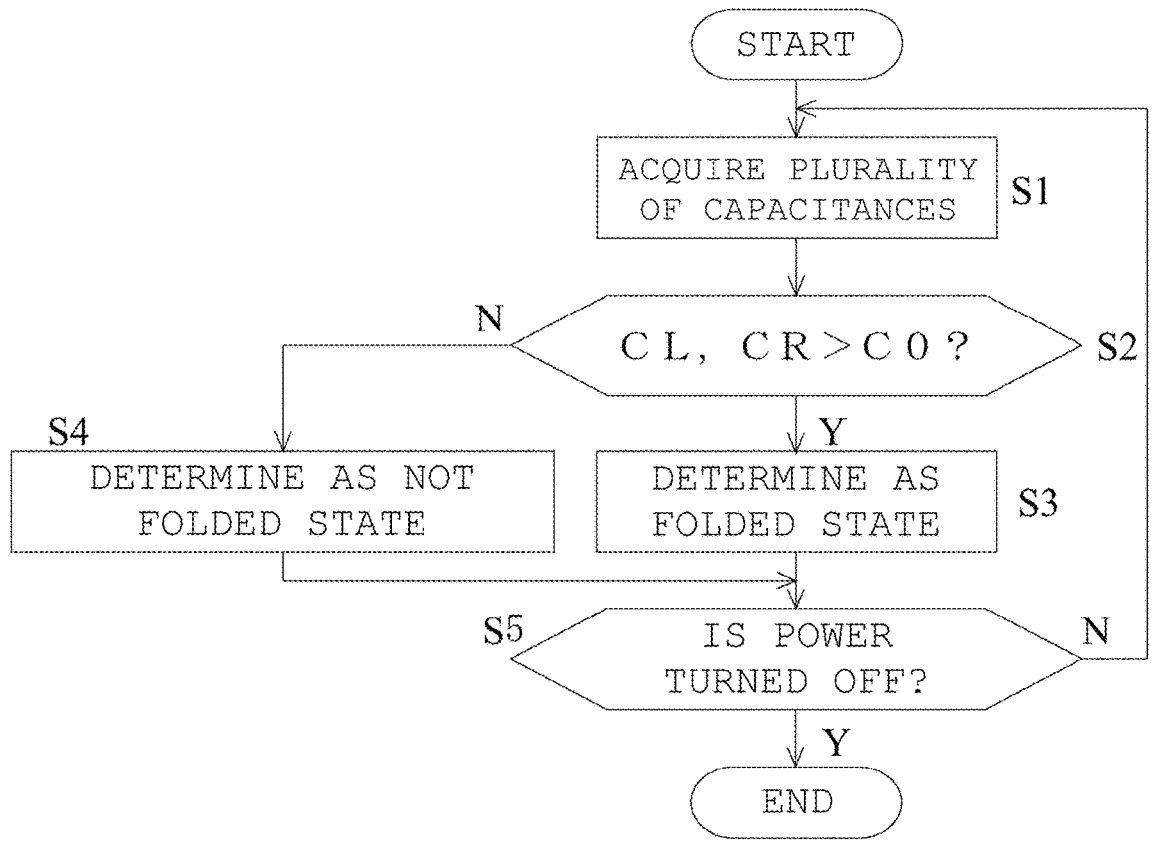
FIG. 10 is a flowchart illustrating a process performed by the control unit 26 according to an exemplary embodiment.

An operation of the electronic device 1 will now be explained further with reference to exemplary drawings. FIG. 10 is a flowchart illustrating a process performed by the control unit 26 according to an exemplary embodiment.

This process is started when the electronic device 1 is powered on. The capacitance calculating unit 24 periodically (or continuously) acquires, from the receiving circuit 22, a plurality of reception signals indicating the capacitances of the capacitors formed between the first touch sensor electrodes 14 and the second touch sensor electrodes 16, respectively. Based on the reception signals, the capacitance calculating unit 24 calculates a plurality of capacitances. The control unit 26 acquires the capacitances from the capacitance calculating unit 24 (Step S1). As described above, the capacitances include the first reference capacitance C0, the left capacitance CL, and the right capacitance CR.

The control unit 26 then determines whether the left capacitance CL and the right capacitance CR are greater than the first reference capacitance C0 (Step S2) by comparing the respective capacitances. If the left capacitance CL and the right capacitance CR are greater than the first reference capacitance C0, the process goes to Step S3. If the left capacitance CL and the right capacitance CR are not greater than the first reference capacitance C0, the process goes to Step S4.

If the left capacitance CL and the right capacitance CR are greater than the first reference capacitance C0, the control unit 26 determines that the touch sensor 11 is in the folded state (Step S3). If this applies, the control unit 26 outputs a folding signal indicating that the touch sensor 11 is folded. Instead of outputting the folding signal, the control unit 26 can also be configured to control the electronic device 1 to enter a sleep mode, or reduce the brightness of the display 10 of the electronic device 1, for example. The process then goes to Step S5.

If the left capacitance CL and the right capacitance CR are not greater than the first reference capacitance C0, the control unit 26 determines that the touch sensor 11 is not in the folded state (Step S4). If this applies, the control unit 26 does not output the folding signal indicating that touch sensor 11 is folded. It is possible for the control unit 26 to control the electronic device 1 to not enter the sleep mode, and not reduce the brightness of the display 10 of the electronic device 1, for example. The process then goes to Step S5.

In Step S5, the control unit 26 determines whether the power of the electronic device 1 has been turned off (Step S5). If the power of the electronic device 1 has been turned off, this process is ended. If the power of the electronic device 1 has not been turned off, the process can return to Step S1.

[Effects]

With the electronic device 1 configured in the manner described above, the electronic device an distinguish between when the user's finger touches the touch sensor 11 and when the touch sensor 11 is folded. More specifically, if the touch sensor 11 is in the touched state, for example, the left capacitance CL becomes greater than the first reference capacitance C0 and the right capacitance CR. By contrast, if the touch sensor 11 is in the folded state, both the left capacitance CL and the right capacitance CR are greater than the first reference capacitance C0. Therefore, the determining unit 18 determines that the touch sensor 11 is folded if both the left capacitance CL and the right capacitance CR are greater than the first reference capacitance C0. In this manner, the electronic device 1 can distinguish between when the user's finger touches the touch sensor 11 and when the touch sensor 11 is folded.

With the electronic device 1, the process performed by the control unit 26 is simplified. More specifically, the first touch sensor electrodes 14 are transmitting electrodes. The second touch sensor electrodes 16 are receiving electrodes. With this configuration, the determining unit 18 can be configured to determine whether the touch sensor 11 is folded based on the capacitances of the capacitors formed between the calculational first touch sensor electrode 140 and the second touch sensor electrodes 16. For example, the capacitance of the capacitor formed between the left second touch sensor electrode 162L and the calculational first touch sensor electrode 140 is defined as the left capacitance CL. The capacitance of the capacitor formed between the right second touch sensor electrode 162R and the calculational first touch sensor electrode 140 is defined as the right capacitance CR. The capacitance of the capacitor formed between the reference second touch sensor electrode 160 and the calculational first touch sensor electrode 140 is defined as the first reference capacitance C0. The determining unit 18 then determines whether the touch sensor 11 is folded based on the first reference capacitance C0, the left capacitance CL, and the right capacitance CR. The capacitor having the first reference capacitance C0, the capacitor having the left capacitance CL, and the capacitor having the right capacitance CR are aligned along a line in the left-right direction. Therefore, the reception signals indicating the capacitances of the capacitors formed between the calculational first touch sensor electrode 140 and the second touch sensor electrodes 16, respectively, include the reception signals indicating the first reference capacitance C0, the reception signal indicating the left capacitance CL, and the reception signal indicating the right capacitance CR. Moreover, the reception signals indicating the capacitances of the capacitors formed between the calculational first touch sensor electrode 140 and the respective second touch sensor electrodes 16 are output one after another. Therefore, it is not necessary for the control unit 26 to perform a process, such as rearrangement of the reception signals. As a result, the process performed by the control unit 26 is simplified.

With the electronic device 1, the determining unit 18 can determine whether the touch sensor 11 is folded more accurately. More specifically, the left capacitance CL and the right capacitance CR are substantially equal. Therefore, the determining unit 18 can determine whether the touch sensor 11 is folded by determining whether the left capacitance CL and the right capacitance CR are substantially equal.

(First Modification)

Figure 11:
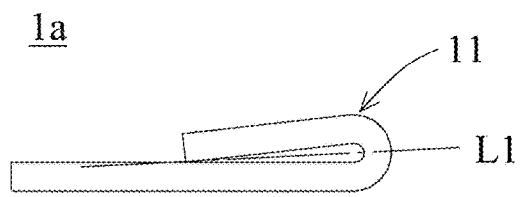
FIG. 11 is a schematic of the electronic device 1a folded along a folding line L1.
Figure 11:
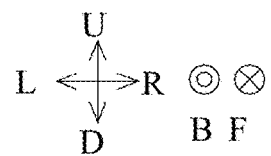
Figure 12:
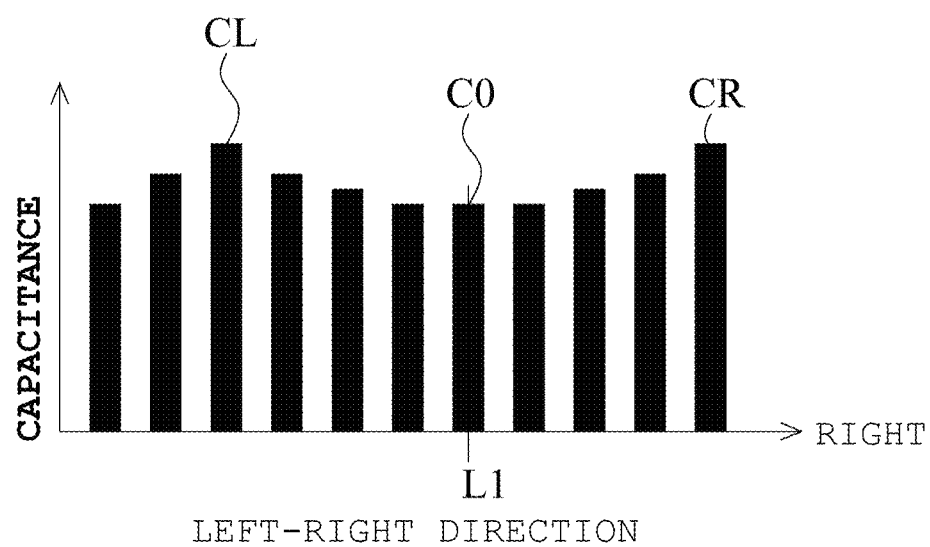
FIG. 12 is a schematic illustrating a distribution of the capacitances formed between the calculational first touch sensor electrode 140 and the second touch sensor electrodes 16, respectively, when the touch sensor 11 is in the folded state.

An electronic device $1a$ according to a first modification of the exemplary embodiment will now be explained with reference to the drawings. FIG. 11 is a schematic of the electronic device $1a$ folded along a folding line L1. As a configuration diagram of the electronic device $1a$ and a sectional view of the electronic device $1a$, references to FIGS. 1 and 2 are made. FIG. 12 is a schematic illustrating a distribution of the capacitances formed between the calculational first touch sensor electrode 140 and the second touch sensor electrodes 16, respectively, when the touch sensor 11 is in the folded state.

The position of the folding line L1 is different in the electronic device $1a$ from that in the electronic device 1. More specifically, in the electronic device 1, the folding line L extends in the front-back direction at the center of the left-right direction of the touch sensor 11. By contrast, in the electronic device $1a$, the folding line L1 extends in the front-back direction in the right part of the touch sensor 11. In this example, the right second touch sensor electrode 162R is the rightmost second touch sensor electrode 16, among the second touch sensor electrodes 16. By contrast, the left second touch sensor electrode 162L is not the leftmost second touch sensor electrode 16, among the second touch sensor electrodes 16. The left second touch sensor electrode 162L is positioned to the right of the leftmost second touch sensor electrode 16, among the second touch sensor electrodes 16. As a result, the distribution of the capacitances becomes as illustrated in FIG. 12. With the capacitance distribution illustrated in FIG. 12, the control unit 26 can be configured to determine that the touch sensor 11 is folded when the left capacitance CL and the right capacitance CR are greater than the first reference capacitance C0.

(Second Modification)

Figure 13:
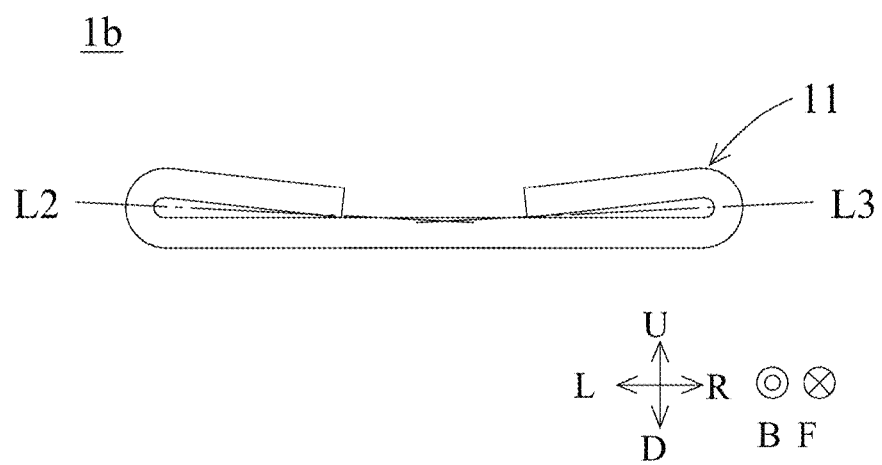
FIG. 13 is a schematic of the electronic device 1b folded along folding lines L2 and L3.
Figure 14:
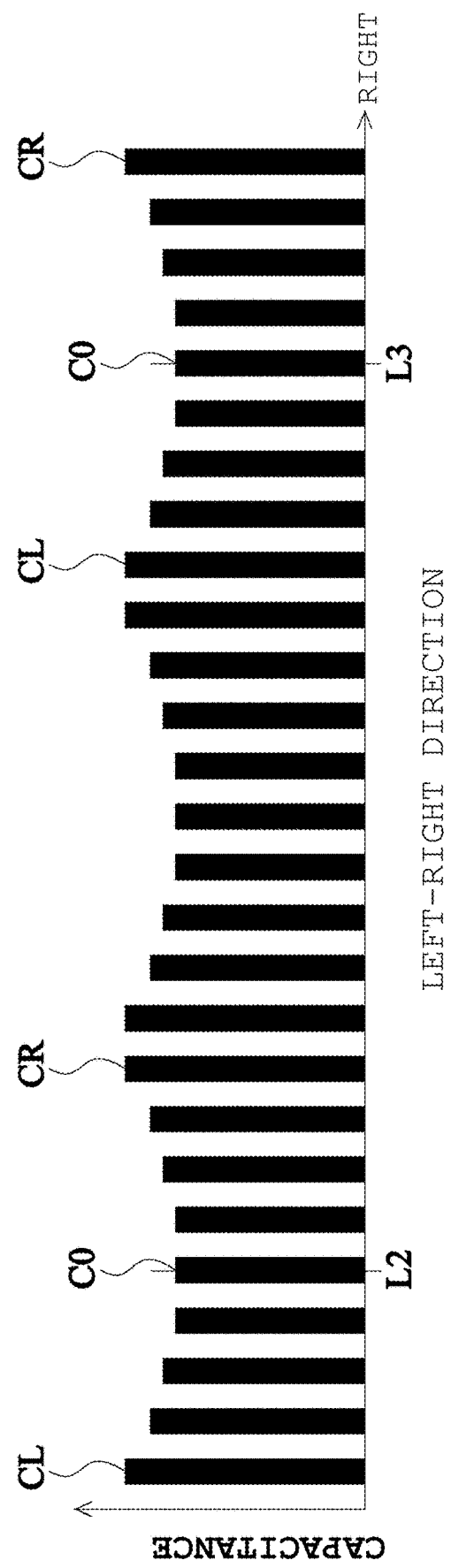
FIG. 14 is a schematic illustrating a distribution of the capacitances formed between the calculational first touch sensor electrode 140 and the second touch sensor electrodes 16, respectively, when the touch sensor 11 is in the folded state.

An electronic device $1b$ according to a second modification of the exemplary embodiment will now be explained with reference to the drawings. FIG. 13 is a schematic of the electronic device $1b$ folded along folding lines L2 and L3. As a configuration diagram of the electronic device $1b$ and a sectional view of the electronic device $1b$, references to FIGS. 1 and 2 are made. FIG. 14 is a schematic illustrating a distribution of the capacitances formed between the calculational first touch sensor electrode 140 and the second touch sensor electrodes 16, respectively, when the touch sensor 11 is in the folded state.

The electronic device $1b$ is different from the electronic device 1 in having two folding lines L2 and L3. More specifically, in the electronic device $1b$, the folding line L2 extends in the front-back direction in the left part of the touch sensor 11. The folding line L3 extends in the front-back direction in the right part of the touch sensor 11. Therefore, the left part of the touch sensor 11 and the right part of the touch sensor 11 will be explained separately.

The left part of the touch sensor 11 will now be explained. The left second touch sensor electrode 162L is the leftmost second touch sensor electrode 16, among the second touch sensor electrodes 16. By contrast, the right second touch sensor electrode 162R is not the rightmost second touch sensor electrode 16, among the second touch sensor electrodes 16. The right second touch sensor electrode 162R is the second touch sensor electrode 16 positioned on the left side of the center of the touch sensor 11 in the left-right direction. As a result, the distribution of the capacitances becomes as illustrated in the left half of FIG. 14. With the capacitance distribution illustrated in FIG. 14, the control unit 26 can be configured to determine that the left part of the touch sensor 11 is folded when the left capacitance CL and the right capacitance CR are greater than the first reference capacitance C0.

The right part of the touch sensor 11 will now be explained. The right second touch sensor electrode 162R is the rightmost second touch sensor electrode 16, among the second touch sensor electrodes 16. By contrast, the left second touch sensor electrode 162L is not the leftmost second touch sensor electrode 16, among the second touch sensor electrodes 16. The left second touch sensor electrode 162L is the second touch sensor electrode 16 positioned on the right side of the center of the touch sensor 11 in the left-right direction. As a result, the distribution of the capacitances becomes as illustrated in the right half of FIG. 14. With the capacitance distribution illustrated in FIG. 14, the control unit 26 in the determining unit 18 can be configured to determine that the right part of the touch sensor 11 is folded when the left capacitance CL and the right capacitance CR are greater than the first reference capacitance C0.

Second Exemplary Embodiment

A configuration of an electronic device $1c$ according to a second exemplary embodiment will now be explained with reference to the drawings. As a configuration diagram of the electronic device $1c$, a sectional view of the electronic device $1c$, and a schematic of the folded electronic device $1c$, references to FIGS. 1 to 3 are made. The method of determining whether the touch sensor 11 is folded is a determination method executed by the electronic device $1c$.

The operation of the determining unit 18 in the electronic device $1c$ is different from that in the electronic device 1. With a focus on this difference, the electronic device $1c$ will now be explained. Because the structures of the display 10, the touch sensor 11, the transmitting circuit 20, and the receiving circuit 22 of the electronic device $1c$ are the same as those of the display 10, the touch sensor 11, the transmitting circuit 20, and the receiving circuit 22 included in the electronic device 1 as described above, explanations thereof will be omitted.

As illustrated in FIG. 1, one of the first touch sensor electrodes 14 is defined as a calculational first touch sensor electrode 140. In this embodiment, among the first touch sensor electrodes 14, the first touch sensor electrode 14 positioned at the center in the up-and-down direction is defined as the calculational first touch sensor electrode 140.

As illustrated in FIG. 3, the one second touch sensor electrode 16 brought to a position nearest to the folding line L, when the touch sensor 11 is folded along the folding line L extending in the front-back direction, is defined as a reference second touch sensor electrode 160 (see FIG. 1).

The second touch sensor electrode 16 at the position nearest to, but separated leftwards from the folding line L by a second distance D2, is defined as a left second touch sensor electrode 162L. In this embodiment, the left second touch sensor electrode 162L is the leftmost second touch sensor electrode 16, among the second touch sensor electrodes 16.

The second touch sensor electrode 16 at the position nearest to, but separated rightwards from the folding line L by the second distance D2, is defined as a right second touch sensor electrode 162R. In this embodiment, the right second touch sensor electrode 162R is the rightmost second touch sensor electrode 16, among the second touch sensor electrodes 16.

The capacitance of a capacitor formed between the second touch sensor electrode 16 (e.g., reference second touch sensor electrode 160) positioned nearest to the folding line L and one of the first touch sensor electrodes (e.g., calculational first touch sensor electrode 140), when the touch sensor 11 is folded along the folding line L, is defined as a second reference capacitance C00.

A capacitance formed between the left second touch sensor electrode 162L and at least one of the first touch sensor electrodes 14 is defined as a left capacitance CL. In this embodiment, the left capacitance CL is the capacitance of a capacitor formed between the left second touch sensor electrode 162L and the calculational first touch sensor electrode 140.

A capacitance formed between the right second touch sensor electrode 162R and at least one of the first touch sensor electrodes 14 is defined as a right capacitance CR. In this embodiment, the right capacitance CR is the capacitance of a capacitor formed between the right second touch sensor electrode 162R and the calculational first touch sensor electrode 140.

When the intensity of the signal indicating the left capacitance CL input to the determining unit 18 and that of the signal indicating the right capacitance CR input to the determining unit 18 are greater than that of the signal indicating the second reference capacitance C00 input to the determining unit 18, the determining unit 18 determines that the touch sensor 11 is folded. In this embodiment, when the intensity of the reception signal indicating the left capacitance CL input to the determining unit 18 and that of the reception signal indicating the right capacitance CR input to the determining unit 18 are greater than that of the reception signal indicating the second reference capacitance C00 input to the determining unit 18, the determining unit 18 determines that the touch sensor 11 is folded.

The determination as to whether the electronic device 1c is implemented as described above is performed by the following steps according to an exemplary aspect. To begin, the intensities of the reception signal indicating the left capacitance CL, of the reception signal indicating the right capacitance CR, and of the reception signal indicating the second reference capacitance C00 are measured. It is then determined whether the intensity of the reception signal indicating the left capacitance CL and that of the reception signal indicating the right capacitance CR are greater than that of the reception signal indicating the second reference capacitance C00. If the intensity of the reception signal indicating the left capacitance CL and that of the reception signal indicating the right capacitance CR are greater than that of the reception signal indicating the second reference capacitance C00, it is checked whether the determining unit 18 has determined that the touch sensor 11 is folded. It is possible to implement this checking as to whether the determining unit 18 has determined that the touch sensor 11 is folded, by checking whether the electronic device 1c has been controlled to enter the sleep mode, or whether the brightness of the display 10 has been decreased, for example.

In the electronic device 1c, the intensity of the signal indicating the left capacitance CL and the intensity of the signal indicating the right capacitance CR are substantially equal in an exemplary aspect. In this manner, the determining unit 18 can determine whether the touch sensor 11 is folded, more accurately.

Additional Exemplary Embodiments

It is noted that the electronic device according to the present invention is not limited to the electronic devices 1 and 1a to 1c, and can be modified in any way within the scope of the essence thereof. Furthermore, the configurations of the electronic devices 1 and 1a to 1c can be combined in any way.

In the electronic devices 1 and 1a to 1c, the determining unit 18 can also determine that a housing is folded. More specifically, the electronic devices 1, 1a to 1c may further include a first housing that supports the touch sensor 11 on the left side of the folding line L, and a second housing that supports the touch sensor 11 on the right side of the folding line L. The determining unit 18 may then determine that the first housing and the second housing are folded when the left capacitance CL and the right capacitance CR are greater than the first reference capacitance C0.

In the electronic devices 1 and 1a to 1c, the first touch sensor electrodes 14 may be the receiving electrodes, and the second touch sensor electrodes 16 may be transmitting electrodes.

In the electronic devices 1, 1a, and 1b, the left capacitance CL may be a capacitance of a capacitor formed between the left second touch sensor electrode 162L and at least one of the first touch sensor electrodes 14, among the first touch sensor electrodes 14. Therefore, the left capacitance CL may be the capacitance of two or more capacitors formed between the left second touch sensor electrode 162L and two or more of the first touch sensor electrodes 14, respectively. In the same manner, the right capacitance CR may be the capacitance of a capacitor formed between the right second touch sensor electrode 162R and at least one of the first touch sensor electrodes 14, among the first touch sensor electrodes 14. Therefore, the right capacitance CR may be the capacitance of two or more capacitors formed between the right second touch sensor electrode 162R and two or more of the first touch sensor electrodes 14, respectively. In this case, the control unit 26 determines that the first housing and the second housing are folded when all of the two or more left capacitances CL and all of the two or more right capacitances CR are greater than the first reference capacitance C0. With this configuration, the control unit 26 can be configured to determine whether the touch sensor 11 is folded more accurately. Furthermore, in an exemplary aspect, the left capacitance CL may be an average of the capacitances of the two or more capacitors formed between the left second touch sensor electrode 162L and the two or more first touch sensor electrodes 14, respectively. Similarly, the right capacitance CR may be an average of the capacitances of the two or more capacitors formed between the right second touch sensor electrode 162R and the two or more of the first touch sensor electrodes 14, respectively. The average is calculated by the determining unit 18, for example.

Moreover, there may be a plurality of reference second touch sensor electrodes 160 in the electronic devices 1, 1a, and 1b. In this case, the first reference capacitance C0 is, for example, an average of the capacitances of the capacitors formed between the reference second touch sensor electrodes 160 and at least one first touch sensor electrode 14, respectively, among the first touch sensor electrodes 14.

In the electronic devices 1 and 1a to 1c, the left capacitance CL may be the capacitance of a capacitor formed between the left second touch sensor electrode 162L and a first calculational first touch sensor electrode 140a (see FIG. 1). The right capacitance CR may be the capacitance of a capacitor formed between the right second touch sensor electrode 162R and a second calculational first touch sensor electrode 140b (see FIG. 1). The first calculational first touch sensor electrode 140a is an electrode different from the second calculational first touch sensor electrode 140b.

It is also noted that in the electronic devices 1, 1a, and 1b, the left capacitance CL and the right capacitance CR can be different from each other. In addition, in the electronic device 1c, the intensity of the signal indicating the left capacitance CL and that of the signal indicating the right capacitance CR can be different.

In the electronic devices 1 and 1a to 1c, the display 10 may include a plurality of separated displays instead of one display. In this case, a boundary between the separated displays corresponds to a folding line.

In the electronic devices 1 and 1a to 1c, at least one of the following two conditions is preferably satisfied.

The left second touch sensor electrode 162L is the leftmost second touch sensor electrode, among the second touch sensor electrodes 16.

The right second touch sensor electrode 162R is the rightmost second touch sensor electrode, among the second touch sensor electrodes 16.

In the electronic devices 1, 1a, and 1b, the control unit 26 may determine that the touch sensor 11 is folded when the left capacitance CL and the right capacitance CR are greater than the first reference capacitance C0, and the amounts of variations of the left capacitance CL and of the right capacitance CR over a predetermined time are equal to or less than a predetermined amount. The predetermined time is, for example, 0.1 second to 1 second. The predetermined value is, for example, about 1/10 to 1/100 of the amount of signal received when a finger is brought into contact.

DESCRIPTION OF REFERENCE SYMBOLS 1, 1a to 1c: Electronic device
10: Display
11: Touch sensor
12: Dielectric film
14: First touch sensor electrode
16: Second touch sensor electrode
18: Determining unit
20: Transmitting circuit
22: Receiving circuit
24: Capacitance calculating unit
26: Control unit
30: Insulating layer
32: Adhesive layer
140: Calculational first touch sensor electrode
140a: First calculational first touch sensor electrode
140b: Second calculational first touch sensor electrode
160: Reference second touch sensor electrode
162L: Left second touch sensor electrode
162R: Right second touch sensor electrode
A1: Range
C0: First reference capacitance
C00: Second reference capacitance
C1 to C3: Capacitance
CL: Left capacitance
CR: Right capacitance
L, L1 to L3: Folding line

The invention claimed is:

1. An electronic device comprising:
a touch sensor that includes:
    a dielectric film having a top surface and a bottom surface,
    a plurality of first touch sensor electrodes disposed on the top surface of the dielectric film and extending in a left-right direction, such that the plurality of first touch sensor electrodes are aligned in a front-back direction that is orthogonal to the left-right direction, and
    a plurality of second touch sensor electrodes disposed below the bottom surface of the dielectric film and extending in the front-back direction, such that the plurality of second touch sensor electrodes are aligned in the left-right direction; and
a determining unit,
wherein at least one of the second touch sensor electrodes is defined as a reference second touch sensor electrode when the at least one second touch sensor electrode is brought within a range of a first distance in the left-right direction from a folding line of the touch sensor that extends in the front-back direction when the touch sensor is folded along the folding line, the first distance being smaller than an interval between adjacent electrodes of the second touch sensor electrodes in the left-right direction,
wherein, when the touch sensor is folded along the folding line, a capacitor is formed between the at least one reference second touch sensor electrode and at least one of the plurality of first touch sensor electrodes, with the formed capacitor having a capacitance configured as a reference capacitance,
wherein the second touch sensor electrode of the plurality of second touch sensor electrodes that is positioned nearest to, but separated leftwards from, the folding line by a second distance is defined as a left second touch sensor electrode, with the second distance being greater than the first distance,
wherein the second touch sensor electrode of the plurality of second touch sensor electrodes that is positioned nearest to, but separated rightwards from, the folding line by the second distance is defined as a right second touch sensor electrode,
wherein a capacitor formed between the left second touch sensor electrode and at least one of the plurality of first touch sensor electrodes comprises a capacitance configured as a left capacitance,
wherein a capacitor formed between the right second touch sensor electrode and at least one of the plurality of first touch sensor electrodes comprises a capacitance configured as a right capacitance, and
wherein the determining unit is configured to determine that the touch sensor is folded when the left capacitance and the right capacitance are each greater than the reference capacitance.

2. The electronic device according to claim 1, wherein:
the plurality of first touch sensor electrodes are a plurality of transmitting electrodes,
the plurality of second touch sensor electrodes are a plurality of receiving electrodes,
the electronic device further comprises:
    a transmitting circuit configured to transmit a transmission signal to the plurality of transmitting electrodes; and
    a receiving circuit configured to receive a reception signal from the plurality of receiving electrodes, and
the determining unit is configured to calculate the left capacitance, the right capacitance, and the reference capacitance based on the reception signal.

3. The electronic device according to claim 1, wherein:
one of the plurality of first touch sensor electrodes is defined as a calculational first touch sensor electrode, the left capacitance is a capacitance of a capacitor formed between the left second touch sensor electrode and the calculational first touch sensor electrode, and the right capacitance is a capacitance of a capacitor formed between the right second touch sensor electrode and the calculational first touch sensor electrode.

4. The electronic device according to claim 3, wherein the reference capacitance is a capacitance of a capacitor formed between the one or more reference second touch sensor electrodes and the calculational first touch sensor electrode.

5. The electronic device according to claim 1, wherein the left capacitance is substantially equal to the right capacitance.

6. The electronic device according to claim 1, wherein each of the plurality of first touch sensor electrodes extend linearly in the left-right direction, and each of the plurality of second touch sensor electrodes extend linearly in the front-back direction.

7. The electronic device according to claim 6, wherein the plurality of first touch sensor electrodes and the plurality of second touch sensor electrodes overlap each other in a plan view thereof to form a lattice-like configuration.

8. An electronic device comprising:
a touch sensor that includes:
a dielectric film having a top surface and a bottom surface,
a plurality of first touch sensor electrodes disposed on the top surface of the dielectric film and extending in a left-right direction, such that the plurality of first touch sensor electrodes are aligned in a front-back direction that is orthogonal to the left-right direction, and
a plurality of second touch sensor electrodes disposed below the bottom surface of the dielectric film and extending in the front-back direction, such that the plurality of second touch sensor electrodes are aligned in the left-right direction; and
a determining unit,
wherein at least one of the second touch sensor electrodes is defined as a reference second touch sensor electrode when the at least one second touch sensor electrode is brought within a range of a first distance in the left-right direction from a folding line of the touch sensor that extends in the front-back direction when the touch sensor is folded along the folding line,
wherein, when the touch sensor is folded along the folding line, a capacitor is formed between the at least one reference second touch sensor electrode and at least one of the plurality of first touch sensor electrodes, with the formed capacitor having a capacitance configured as a reference capacitance,
wherein the second touch sensor electrode of the plurality of second touch sensor electrodes that is positioned nearest to, but separated leftwards from, the folding line by a second distance is defined as a left second touch sensor electrode, with the second distance being greater than the first distance,
wherein the second touch sensor electrode of the plurality of second touch sensor electrodes that is positioned nearest to, but separated rightwards from, the folding line by the second distance is defined as a right second touch sensor electrode,
wherein a capacitor formed between the left second touch sensor electrode and at least one of the plurality of first touch sensor electrodes comprises a capacitance configured as a left capacitance,
wherein a capacitor formed between the right second touch sensor electrode and at least one of the plurality of first touch sensor electrodes comprises a capacitance configured as a right capacitance,
wherein the determining unit is configured to determine that the touch sensor is folded when the left capacitance and the right capacitance are each greater than the reference capacitance, and
wherein respective capacitances between the plurality of first and second touch sensor electrodes increases as a distance from the folding line increases on a left side, and respective capacitances between the plurality of first and second touch sensor electrodes increases as a distance from the folding line increases on a right side.

9. An electronic device comprising:
a touch sensor that includes;
a dielectric film having a top surface and a bottom surface,
a plurality of first touch sensor electrodes disposed on the top surface of the dielectric film and extending in a left-right direction, such that the plurality of first touch sensor electrodes are aligned in a front-back direction that is orthogonal to the left-right direction,
a plurality of second touch sensor electrodes disposed below the bottom surface of the dielectric film and extending in the front-back direction, such that the plurality of second touch sensor electrodes are aligned in the left-right direction; and
a determining unit,
wherein, when the touch sensor is folded along a folding line extending in the front-back direction, a capacitor is formed between a second touch sensor electrode of the plurality of second touch sensor electrodes that is positioned nearest to the folding line and one of the plurality of first touch sensor electrode when the second touch sensor electrode is brought within a range of a distance that is smaller than an interval between adjacent electrodes of the second touch sensor electrodes in the left-right direction, with the formed capacitor having a capacitance that is configured as a reference capacitance,
wherein the second touch sensor electrode of the plurality of second touch sensor electrodes that is positioned nearest to, but separated leftwards from, the folding line is defined as a left second touch sensor electrode,
wherein the second touch sensor electrode of the plurality of second touch sensor electrodes that is positioned nearest to, but separated rightwards from, the folding line is defined as a right second touch sensor electrode,
wherein a capacitor formed between the left second touch sensor electrode and at least one of the plurality of first touch sensor electrodes comprises a capacitance configured as a left capacitance,
wherein a capacitor formed between the right second touch sensor electrode and at least one of the plurality of first touch sensor electrodes comprises a capacitance configured as a right capacitance, and
wherein the determining unit is configured to determine that the touch sensor is folded when an intensity of a signal indicating the left capacitance and an intensity of a signal indicating the right capacitance are both greater than an intensity of a signal indicating the reference capacitance.

10. The electronic device according to claim 9, wherein:
the plurality of first touch sensor electrodes are a plurality of transmitting electrodes, the plurality of second touch sensor electrodes are a plurality of receiving electrodes, the electronic device further comprises:
- a transmitting circuit configured to transmit a transmission signal to the plurality of transmitting electrodes; and
- a receiving circuit configured to receive a reception signal from the plurality of receiving electrodes, and the determining unit is configured to determine that the touch sensor is folded when an intensity of the signal indicating the left capacitance and an intensity of the signal indicating the right capacitance are greater than an intensity of a signal indicating the reference capacitance input to the determining unit.

11. The electronic device according to claim 9, wherein:
one of the plurality of first touch sensor electrodes is defined as a calculational first touch sensor electrode,
the left capacitance is a capacitance of a capacitor formed between the left second touch sensor electrode and the calculational first touch sensor electrode, and
the right capacitance is a capacitance of a capacitor formed between the right second touch sensor electrode and the calculational first touch sensor electrode.

12. The electronic device according to claim 11, wherein the reference capacitance is a capacitance of a capacitor formed between the second touch sensor electrode positioned nearest to the folding line and the calculational first touch sensor electrode.

13. The electronic device according to claim 9, wherein an intensity of a signal indicating the left capacitance is substantially equal to an intensity of a signal indicating the right capacitance.

14. The electronic device according to claim 9, wherein each of the plurality of first touch sensor electrodes extend linearly in the left-right direction, and each of the plurality of second touch sensor electrodes extend linearly in the front-back direction.

15. The electronic device according to claim 14, wherein the plurality of first touch sensor electrodes and the plurality of second touch sensor electrodes overlap each other in a plan view thereof to form a lattice-like configuration.

16. A method of determining whether an electronic device is folded, with the electronic device including a touch sensor having a dielectric film with a top surface and a bottom surface, a plurality of first touch sensor electrodes disposed on the top surface of the dielectric film and extending in a left-right direction, such that the plurality of first touch sensor electrodes are aligned in a front-back direction that is orthogonal to the left-right direction, and a plurality of second touch sensor electrodes disposed below the bottom surface of the dielectric film and extending in the front-back direction, such that the plurality of second touch sensor electrodes are aligned in the left-right direction, the method comprising:
- defining at least one of the second touch sensor electrodes as a reference second touch sensor electrode when the at least one second touch sensor electrode is brought within a range of a first distance in the left-right direction from a folding line of the touch sensor that extends in the front-back direction when the touch sensor is folded along the folding line, the first distance being smaller than an interval between adjacent electrodes of the second touch sensor electrodes in the left-right direction;
- when the touch sensor is folded along the folding line, defining a capacitance of a capacitor formed between the at least one reference second touch sensor electrode and at least one of the plurality of first touch sensor electrodes as a reference capacitance;
- defining the second touch sensor electrode positioned nearest to, but separated leftwards from, the folding line by a second distance as a left second touch sensor electrode, with the second distance being greater than the first distance;
- defining the second touch sensor electrode positioned nearest to, but separated rightwards from, the folding line by the second distance as a right second touch sensor electrode;
- defining a capacitance of a capacitor formed between the left second touch sensor electrode and at least one of the plurality of first touch sensor electrodes as a left capacitance;
- defining a capacitance of a capacitor formed between the right second touch sensor electrode and at least one of the plurality of first touch sensor electrodes as a right capacitance; and
- determining that the touch sensor is folded when the left capacitance and the right capacitance are each greater than the reference capacitance.

17. The method according to claim 16, further comprising:
- defining one of the plurality of first touch sensor electrodes as a calculational first touch sensor electrode;
- determining the left capacitance as a capacitance of a capacitor formed between the left second touch sensor electrode and the calculational first touch sensor electrode;
- determining the right capacitance as a capacitance of a capacitor formed between the right second touch sensor electrode and the calculational first touch sensor electrode; and
- determining the reference capacitance as a capacitance of a capacitor formed between the one or more reference second touch sensor electrodes and the calculational first touch sensor electrode.

18. The method according to claim 16, wherein the left capacitance is substantially equal to the right capacitance.

19. A method of determining whether an electronic device is folded, with the electronic device including a touch sensor having a dielectric film with a top surface and a bottom surface, a plurality of first touch sensor electrodes disposed on the top surface of the dielectric film and extending in a left-right direction, such that the plurality of first touch sensor electrodes are aligned in a front-back direction that is orthogonal to the left-right direction, and a plurality of second touch sensor electrodes disposed below the bottom surface of the dielectric film and extending in the front-back direction, such that the plurality of second touch sensor electrodes are aligned in the left-right direction, the method comprising:
- when the touch sensor is folded along a folding line extending in the front-back direction, defining a capacitance of a capacitor formed between a second touch sensor electrode of the plurality of second touch sensor electrodes that is positioned nearest to the folding line and one of the plurality of first touch sensor electrode as a reference capacitance when the second touch sensor electrode is brought within a range of a distance that is smaller than an interval between adjacent electrodes of the second touch sensor electrodes in the left-right direction;
- defining the second touch sensor electrode positioned nearest to, but separated leftwards from, the folding line as a left second touch sensor electrode;

defining the second touch sensor electrode positioned nearest to, but separated rightwards from, the folding line as a right second touch sensor electrode;

defining a capacitance of a capacitor formed between the left second touch sensor electrode and at least one of the plurality of first touch sensor electrodes as a left capacitance;

defining a capacitance of a capacitor formed between the right second touch sensor electrode and at least one of the plurality of first touch sensor electrodes as a right capacitance; and determining that the touch sensor is folded when an intensity of a signal indicating the left capacitance and an intensity of a signal indicating the right capacitance are greater than an intensity of a signal indicating the reference capacitance.

20. The method according to claim 19, wherein the left capacitance is substantially equal to the right capacitance.

* * * * *